US011989609B2

(12) United States Patent
Dupaquis et al.

(10) Patent No.: US 11,989,609 B2
(45) Date of Patent: May 21, 2024

(54) METHOD OF SECURING A COMPARISON OF DATA DURING THE EXECUTION OF A PROGRAM

(71) Applicant: Rambus Inc., Sunnyvale, CA (US)

(72) Inventors: Vincent Dupaquis, Biver (FR); Eric Le Cocquen, Saint Maximin la Sainte Beaume (FR)

(73) Assignee: Rambus Inc., San Jose, CA (US)

( * ) Notice: Subject to any disclaimer, the term of this patent is extended or adjusted under 35 U.S.C. 154(b) by 155 days.

(21) Appl. No.: 15/808,362

(22) Filed: Nov. 9, 2017

(65) Prior Publication Data

US 2018/0144228 A1    May 24, 2018

Related U.S. Application Data

(63) Continuation of application No. PCT/FR2016/051090, filed on May 10, 2016.

(30) Foreign Application Priority Data

May 13, 2015 (FR) ..................... 1554348

(51) Int. Cl.
*H04L 9/00* (2022.01)
*G06F 7/02* (2006.01)
(Continued)

(52) U.S. Cl.
CPC ......... *G06K 19/07372* (2013.01); *G06F 7/02* (2013.01); *G06F 11/14* (2013.01);
(Continued)

(58) Field of Classification Search
CPC ..... G06K 19/07372; G06F 7/02; G06F 11/14; G06F 21/52; G06F 21/60; G06F 21/75;
(Continued)

(56) References Cited

U.S. PATENT DOCUMENTS

| 5,621,909 A | 4/1997 | Webb et al. |
| 7,844,828 B2 | 11/2010 | Giraud et al. |

(Continued)

FOREIGN PATENT DOCUMENTS

| CN | 1397121 A | 2/2003 |
| CN | 103188075 B | 1/2016 |

(Continued)

OTHER PUBLICATIONS

International Search Report for PCT Application PCT/FR2016/051090, dated Aug. 28, 2016, 4 pages.

(Continued)

*Primary Examiner* — Daniel B Potratz
*Assistant Examiner* — Syed M Ahsan
(74) *Attorney, Agent, or Firm* — Lowenstein Sandler LLP (57) ABSTRACT

This disclosure relates to a method for securing the execution of a program by a processor, including a comparison instruction for comparing two data items, followed by a program operation which is selected as a function of a comparison result provided by the comparison instruction. The method may include, before the execution of the comparison instruction, calculating in various ways comparison data representative of the equality of the data to be compared, after the execution of the comparison instruction, verifying whether the comparison data calculated are consistent with the fact that the program operation is selected or not selected, and activating an error signal if the comparison data are mutually inconsistent or inconsistent with the result of the comparison.

17 Claims, 5 Drawing Sheets

(51) Int. Cl.
*G06F 11/14* (2006.01)
*G06F 21/52* (2013.01)
*G06F 21/60* (2013.01)
*G06F 21/75* (2013.01)
*G06K 19/073* (2006.01)
*G09C 1/00* (2006.01)
*H04L 9/40* (2022.01)
*G06F 9/30* (2018.01)

(52) U.S. Cl.
CPC .............. *G06F 21/52* (2013.01); *G06F 21/60* (2013.01); *G06F 21/75* (2013.01); *G09C 1/00* (2013.01); *H04L 9/004* (2013.01); *H04L 63/0428* (2013.01); *G06F 9/30021* (2013.01); *G06F 2207/7271* (2013.01)

(58) Field of Classification Search
CPC ......... G06F 2207/7271; G06F 9/30021; H04L 9/004; H04L 63/0428; G09C 1/00
See application file for complete search history.

(56) References Cited

U.S. PATENT DOCUMENTS 9,501,277 B2  11/2016  Guillemin et al.
2007/0106519 A1* 5/2007 Giraud .................... G06F 21/54
 726/22
2014/0279985 A1* 9/2014 Fontenot ................. G06F 21/57
 707/698
2014/0379770 A1* 12/2014 Guillemin ........... G06F 9/30021
 708/236
2016/0147586 A1* 5/2016 Mayer ................. G06F 11/0721
 714/37

FOREIGN PATENT DOCUMENTS

CN   102541713 B   3/2017
EP      1538509 A1   6/2005
FR      3007552 A1  12/2014
WO  WO-2005-055021 A1   6/2005

OTHER PUBLICATIONS

CN Office Action with dated Feb. 6, 2020 re: CN Appln. No. 201680027175.9. 15 Pages. (With Translation).
CN Office Action with dated Aug. 7, 2020 re: CN Appln. No. 201680027175.9. 13 Pages (W/Translation).
CN Office Action with dated Nov. 20, 2020 re: CN Appln. No. 201680027175.9. 11 pages. (W/Translation).

* cited by examiner

METHOD OF SECURING A COMPARISON OF DATA DURING THE EXECUTION OF A PROGRAM

CROSS REFERENCE TO RELATED APPLICATIONS

This application is a continuation of, and claims priority to PCT Application No. PCT/FR2016/051090, filed May 10, 2016, which claims the benefit of French Application No. FR1554348, filed May 13, 2015, the disclosures of which are incorporated herein by reference in their entireties.

TECHNICAL FIELD

This disclosure relates to methods and systems to control execution of a program by a processor, in particular, to protect the program against modification or tampering, before or during its execution. This disclosure applies to parts of a program relating to critical decision-making, based on data comparisons.

BACKGROUND

Secure integrated circuits, such as, smart card ICs, are subject to various fraud attacks, e.g., discover the structure and/or stored data secrets. Such circuits include, for example, cryptographic circuits, or microprocessors programmed to execute cryptographic algorithms.

Some hacking methods involve injecting errors into an integrated circuit to disrupt the execution of so-called sensitive operations, for example, authentication operations or operations of a cryptography algorithm.

Further, such attacks, (e.g., fault or error injection attacks) may occur during sensitive calculation phases, for example, during calculation phases of an identification code or during the reading of a cryptographic key in a memory. This allows, in combination with mathematical models and using intentionally false results, by means of the disturbances applied to the integrated circuit, to determine a secret element such as a secret key or a password, or to deduce the structure of a cryptography algorithm.

In particular, localized attacks consist in introducing disturbances (glitches) at a given point of the circuit, for example, by means of a laser beam or an X-ray beam. A localized attack may concern, for example, the supply voltage, a data or address path, or the clock signal of the integrated circuit.

Such attacks may in particular trigger a critical operation normally performed as a result of a data comparison (e.g., a comparison of identification or authentication data with expected values). By such an attack, a data comparison can be disturbed during the reading in memory of the data to be compared, during the actual comparison, or during the decision-making and the instruction jump to reach the instructions to be executed based on the result of the comparison. The attack can also target the read address of one of the data items to be compared, and therefore cause a comparison error. The attack can also target the read address of the program memory and thus cause a jump in the absence of any jump instruction code, so that a critical operation is triggered without actually executing the comparison instruction conditioning the execution of the critical operation.

SUMMARY

In one general aspect, a method for securing the execution of a program by a processor, including a comparison instruction of two data items, followed by a program operation selected on the basis of a comparison result provided by the comparison instruction. The method may include before the execution of the comparison instruction, computing comparison variables representative of the equality of the data items to be compared, after executing the comparison instruction, checking whether the computed comparison variables are consistent with the selection or non-selection of the program operation, and enabling an error signal if the comparison variables are inconsistent with each other or with the result of the comparison.

In some implementations, the method may include, after the execution of the comparison instruction, checking the consistency between the comparison variables and the event that the program operation is selected or not based on the result of the comparison.

In some implementations, the comparison instruction may be followed by two program operations respectively selected if the comparison instruction determines that the data items to be compared are identical, and if the comparison instruction determines that the data items to be compared are different, the execution of the comparison instruction is followed by checking of the consistency between the computed comparison variables and the selected program operation based on the result of the comparison.

In some implementations, the comparison variables may include at least two of the following comparison variables: a first binary comparison variable whose value is a function of the equality of the data items to be compared; a second binary comparison variable equal to a combination of the bits of a first binary word by a logic OR operation, the first binary word resulting from a bit-wise combination of the data items to be compared by a logical exclusive-OR operation$; a third binary comparison variable equal to a combination of the bits of a second binary word by a logic AND operation, the second binary word resulting from a bit-wise combination by a logic OR operation of one of the data items to be compared with the binary one's complement of the other data item to be compared; and a fourth binary comparison variable equal to a combination of the bits of a third binary word by a logic OR operation, the third binary word resulting from a bit-wise combination by a logic AND operation of one of the data items to be compared with the binary one's complement of the other data item to be compared.

In some implementations, the method may include at least one of the data items to be compared may be read from a memory at each calculation of a comparison variable.

In some implementations, the method may include enabling at least one of a first flag if the compared data items are identical and a second flag if the compared data items are different.

In some implementations, the method may include the data items to be compared are blocks of several words, each word of one of the blocks to be compared being individually compared with a corresponding word of the other of the blocks to be compared. The method may include counting the number of equal words between the two blocks to be compared, wherein the comparison instruction compares the number of equal words between the two blocks to be compared with the number of words in each block to be compared.

In some implementations, the method may include counting the number of different words between the two blocks to be compared and checking that the sum of the number of equal words and the number of different words between the two blocks to be compared is equal to the number of words in each block to be compared.

In some implementations, the method may include the data items to be compared are blocks of several words, each word of one of the blocks to be compared being individually compared with a corresponding word of the other of the blocks to be compared. The method may include calculating a sum of the words of each block to be compared, the comparison instruction comparing the sums of words of each block to be compared.

In some implementations, the method may include a first of the word sums of one of the blocks to be compared includes successive values of a word counter counting words of the block. The method may include calculating the sum of the successive values of the word counter from the number of words in each block to be compared and of modifying the first word sum by subtracting from it the calculated sum of the successive values of the word counter.

In another general aspect, a circuit for securing the execution of a test in a program executed by a processor can be configured to implement the security method of example embodiments.

In another general aspect, a computer program product including instructions which, when executed by a processor, implement the method of example embodiments.

BRIEF DESCRIPTION OF DRAWINGS

Other advantages and features will become more clearly apparent from the following description of particular embodiments of the invention provided for exemplary purposes only and represented in the appended drawings, in which.

DETAILED DESCRIPTION

In the figures, like referenced signs may refer to like parts throughout the different figures unless otherwise specified.

In view of the drawbacks and considerations noted above, it may be desirable to propose methods and devices to secure a data comparison in a program executed by a processor and to verify the decision making resulting from such a comparison.

It may also be desirable to achieve this aim by using as little as possible the resources of the processor executing the program and without increasing the coding tasks necessary for developing the program.

Figure 1:
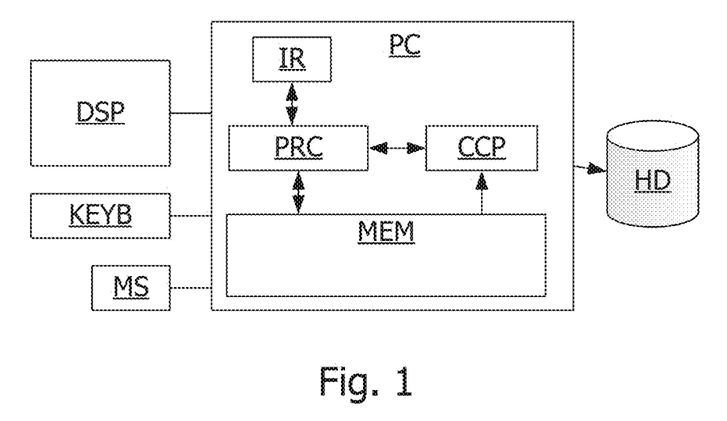
FIG. 1 schematically represents an example of a computer capable of implementing a method for securing the execution of a data comparison, according to an example embodiment.

FIG. 1 illustrates an electronic device PC adapted to the implementation of a method for securing decision-making following a data comparison step, according to an example embodiment. The device PC may include a memory MEM storing a program and data, and a processor PRC configured to execute a program. The device may comprise hardware units such as input/output units including a user control interface, and communication or network interface circuits IR. The control interface may thus comprise a display screen DSP, one or more input devices, such as, for example, a mouse MS and a keyboard KEYB, and/or other input/output peripheral devices, such as, for example, a touch pad, and an external memory such as a hard disk HD. The electronic device PC may be a computer or any other device comprising a processor executing a program, such as, for example, a smartphone, a digital tablet, a smart card microcircuit and/or a secure element. The electronic device may also be an embedded component in a system such as a System on Chip (SoC) or part of an integrated circuit.

In some implementations, the device PC may include a microcircuit CCP such as, a co-processor, connected to the processor PRC, and configured to provide the processor PRC with functions fore securing the execution of a comparison operation, and securing the decision making following the comparison operation.

Figure 2A:
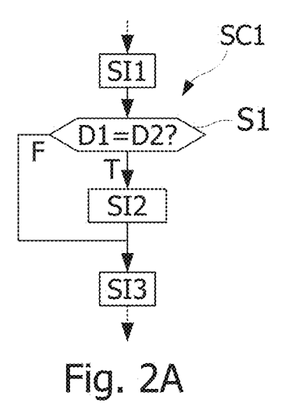
FIGS. 2A and 2B are flow charts of a program portion including a data comparison, respectively without and with the implementation of a security method according to an example embodiment.
Figure 2B:
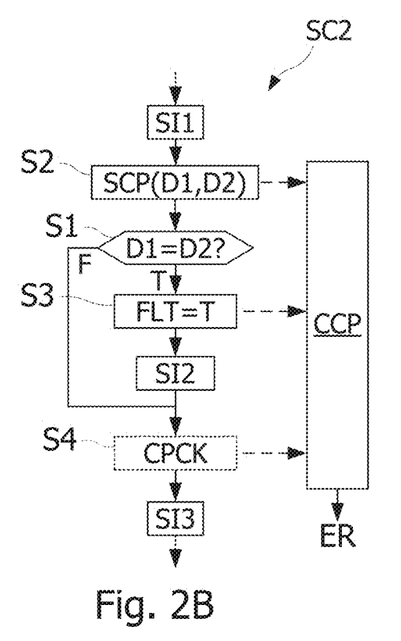

FIGS. 2A and 2B illustrate program portions SC1, SC2 executed by the processor PRC and including series of instructions SI1, SI2, SI3 and a data comparison operation S1. The comparison operation S1 may be executed between the series of instructions SI1 and SI3. The comparison operation S1 may compare data items D1 and D2 and may execute the series of operations SI2 if the data items D1 and D2 are identical. In other words, if the data items D1 and D2 are identical, the series of instructions SI1, SI2 and SI3 may be executed, if not only the series of instructions SI1 and SI3 are executed.

The program portion SC1 may be conventional, while the program portion SC2 may be secured by providing additional steps S2 and S3, according to an example embodiment. The step S2 that is executed before the comparison operation S1 calls a secure comparison function SCP by providing it with the data items to be compared D1, D2, or the respective addresses of the data items. Step S3 may be executed if the comparison operation S1 determines that the data items D1 and D2 are identical. Step S3 may enable a flag FLT registering that the processor PRC has executed the program branch that may be executed when the data items D1 and D2 are identical. The enabling of the flag FLT may be followed by operations for checking the consistency between the comparison result for the data items D1 and D2 obtained through the function SCP and the decision making corresponding to this comparison. If these checking operations detect an inconsistency, an error signal ER can be enabled.

Depending on the context of the program, step S3 can be executed before or after the series of instructions SI2, or even after only part of the instructions of the series SI2. Thus, step S3 can be executed before a critical operation. The step S3 may be configured to interrupt the execution of the program by the processor PRC and/or to activate an error management function if the decision making which led to the execution of the series of instructions SI2 is detected erroneous during step S3 (error signal ER enabled). In some implementations, the error management function can be active without the normal execution of the program being interrupted.

The series of instructions SI3, which may be executed whatever the result of the comparison carried out in step S1, may be preceded by a step S4 calling a function CPCK for checking proper execution of the test. For example, the function CPCK may check the consistency between the state of the flag FLT and the results provided by the comparison function SCP, and enable the error signal ER when an inconsistency is detected. If the data items D1 and D2 should not be different in step S1, the function CPCK can check the value of the flag FLT, and if it is not enabled, the function CPCK may enable the error signal ER.

Figure 3A:
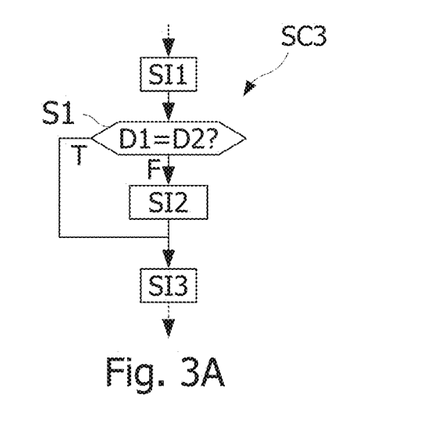
FIGS. 3A and 3B are flow charts of a program portion including a data comparison, respectively, without and with the implementation of a security method according to another example embodiment.
Figure 3B:
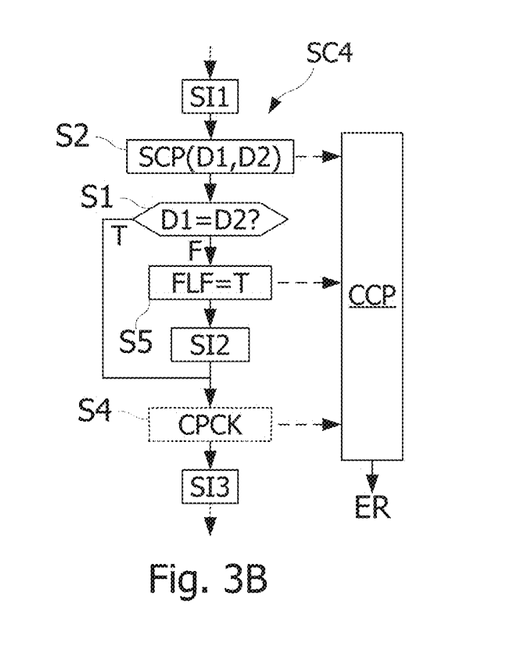

FIGS. 3A and 3B illustrate program portions SC3, SC4 executed by the processor PRC, and including the series of instructions SI1, SI2, SI3 and the data comparison operation S1. The comparison operation S1 may be executed between the series of instructions SI1 and SI3. The comparison operation S1 may compare data items D1 and D2 and may execute the series of operations SI2 if the data items D1 and D2 are different. If the data items D1 and D2 are identical, only the series of instructions SI1 and SI3 may be executed, otherwise the series of instructions SI1, SI2 and S13 may be executed. The program portion SC3 may be conventional, while the program portion SC4 is secured, according to an example embodiment.

The program portions SC3, SC4 differ from the program portions SC1, SC2 of FIGS. 2A and 2B, in that the operation SI2 is executed, not when the data items D1 and D2 are identical, but when they are different. In FIG. 3B, instead of executing the step S3 when the data items are identical, a step S5 is executed when the data items D1 and D2 are different. Step S5 may enable a flag FLF registering that the processor PRC has executed the program branch that is executed when the data items D1 and D2 are different. The enabling of the flag FLF may be followed by operations for checking the consistency between the comparison result for the data items D1 and D2 obtained through the function SCP and the decision making corresponding to this comparison.

The program portion SC4 of FIG. 3B may also include the step S4 for calling the function CPCK for checking the proper execution of the test. As before, the function CPCK can check the consistency between the state of the flag FLF and the results provided by the comparison function SCP, and enable the error signal ER if an inconsistency is detected. If the data items D1 and D2 should not be identical in step S1, the function CPCK may check the value of the flag FLF, and if it is not enabled, the function CPCK may enable an error signal ER.

Figure 4A:
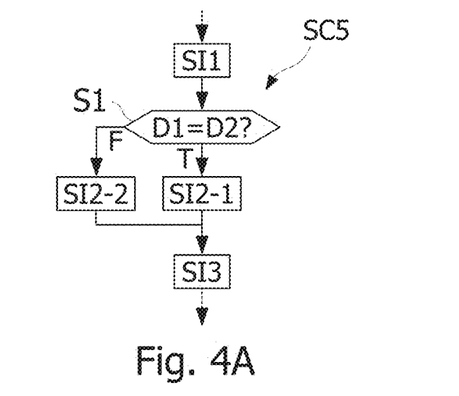
FIGS. 4A and 4B are flow charts of a program portion including a data comparison, respectively without and with the implementation of a security method according to another example embodiment.
Figure 4B:
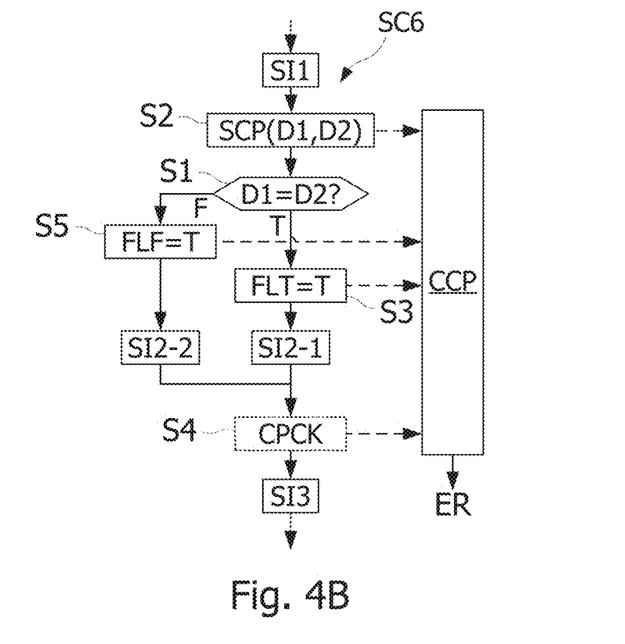

FIGS. 4A and 4B show program portions SC5, SC6 executed by the processor PRC, and including the series of instructions SI1, SI3, and alternative series of instructions SI2-1, SI2-2, replacing the series of instructions SI2, and the data comparison operation S1. The comparison operation S1 may be executed between the series of instructions SI1 and SI3. The comparison operation S1 may compare data items D1 and D2 and may execute the series of operations SI2-1 if the data items D1 and D2 are identical, and may execute the series of operations SI2-2 if the data items D1 and D2 are different. Thus, if the data items D1 and D2 are identical, the series of instructions SI1, SI2-1 and SI3 may be executed, otherwise the series of instructions SI1, SI2-2 and SI3 may be executed. The program portion SC5 may be conventional, while the program portion SC6 is secured, according to an example embodiment.

In FIG. 4B, before the comparison operation S1, the secure comparison function SCP may be called with the data items to compare D1, D2 or the respective addresses of the data items (step S2). The branch executed when the data items D1 and D2 may be identical includes the step S3 for enabling the flag FLT and the branch executed when the data items are different includes the step S5 for enabling the flag FLF. Here again, the steps S3 and S5 may be executed before or after the series of instructions SI2-1, SI2-2, respectively, or even after only a portion of the instructions of the series SI2-1, SI2-2. Preferably, step S3 and/or step S5 are carried out before a critical operation. As before, steps S3 and S5 may be configured to interrupt the execution of the program by the processor PRC if the decision-making which led to the execution of the series of instructions SI2-1 or SI2-2 is detected as incorrect during step S3 or S5 (error signal ER enabled).

The series of instructions SI3, executed whatever the result of the comparison carried out in step S1, may be preceded by the step S4 calling the function CPCK for checking the correct execution of the test. Thus, the function CPCK may check, for example, that only one of the flags FLF, FLT is enabled. It should be noted that this check can also be carried out when using program portions SC2 (FIG. 2B) and SC4 (FIG. 3B).

In some implementations, the functions executed in steps S2, S3, S4 and S5 may be implemented by the circuit CCP. In this case, the error signal ER may be transmitted by the circuit CCP to the processor PRC.

Of course, switching into the instruction-less branches of the flow charts of FIGS. 2B and 3B can also be checked by providing a step S5 in the instruction-less branch of the flow chart of FIG. 2B and a step S3 in the instruction-less branch of the flowchart of FIG. 3B.

Figure 5A:
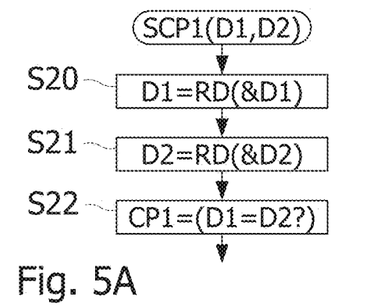
FIGS. 5A to 5D are flow charts of sequences of data comparison steps, according to example embodiments.

FIGS. 5A to 5D illustrate examples of comparison sequences SCP1, SCP2, SCP3, SCP4 of two data items D1, D2, that can be executed by the secure comparison function SCP called in step S2. In FIG. 5A, the comparison sequence SCP1 may include steps S20 to S22. In steps S20 and S21, the data items to be compared D1 and D2 may be read in memory at respective addresses &D1 and &D2. In step S22, a Boolean variable CP1 may be calculated on the basis of a direct comparison between the data items D1 and D2 read from memory at steps S20 and S21. For example, the variable may be equal to 1 (or True) if the data items D1 and D2 are identical, and 0 (or False) if not.

Figure 5B:
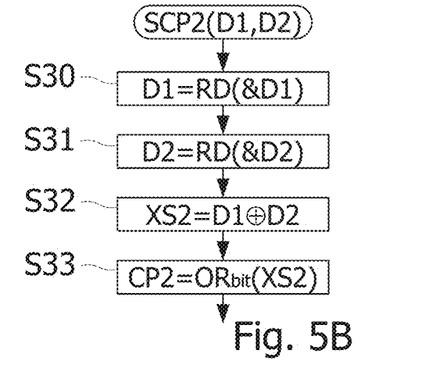

In FIG. 5B, the comparison sequence SCP2 may include steps S30 to S33. In steps S30 and S31, the data items to be compared D1 and D2 may be read from memory at their respective addresses &D1 and &D2. In step S32, the data items D1 and D2 read from memory in steps S30 and S31 may be combined with each other by a bit-wise exclusive OR (XOR) logic operation. In step S33, the bits of the result XS2 provided by the XOR operation may be combined with one another by an OR logical operation. The result of this combination may be assigned to the Boolean variable CP2. In this way, if the data items D1 and D2 are identical, the result XS2 is 0, and therefore the variable CP2 is equal to 0 (or False). On the contrary, if the data items D1 and D2 differ from each other by at least one bit, the result XS2 may be different from 0, and therefore the variable CP2 may be 1 (or True).

Figure 5C:
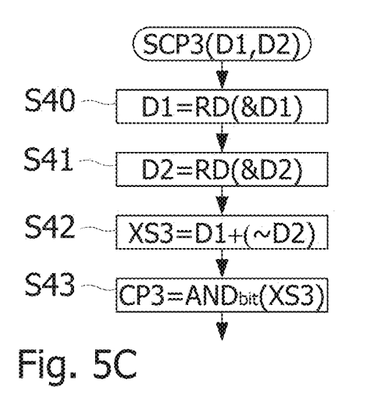

In FIG. 5C, the comparison sequence SCP3 includes steps S40 to S43. In steps S40 and S41, the data items to be compared D1 and D2 may be read from memory at their respective addresses &D1 and &D2. In step S42, the data items D1 and D2 read from memory in steps S40 and S41 may be combined by a bit-wise logic OR operation such that the data item D1 may be combined with the one's complement (~D2) of the data item D2. In step S43, the bits of the result XS3 produced by the operation executed in step S42 may be combined with one another by a logical AND operation. The result of this combination may be assigned to the Boolean variable CP3. In this manner, if the data items D1 and D2 are identical, the result XS3 is $FF . . . F (in hexadecimal, for example, $FFFF in the case of 16-bit data), and thus the variable CP3 is 1 (or True). On the other hand, if the data items D1 and D2 differ from one another by at least one bit, the result XS3 may not be necessarily different from $FF . . . F, and therefore the variable CP3 can be 0 (False) or 1.

Figure 5D:
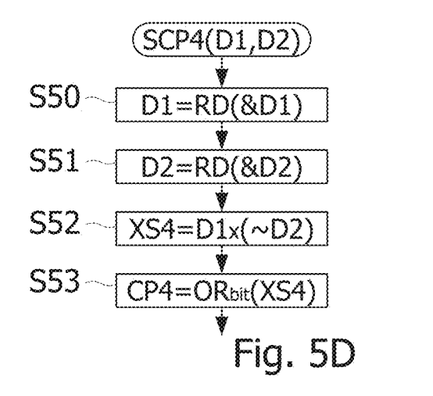

In FIG. 5D, the comparison sequence SCP4 includes steps S50 to S53. In steps S50 and S51, the data items to be compared D1 and D2 may be read from memory at their respective addresses &D1 and &D2. In step S52, the data items D1 and D2 read from memory in steps S50 and S51 may be combined by a bit-wise logic AND operation such that the data item D1 may be combined with the one's complement (~D2) of the data item D2. In step S53, the bits of the result XS4 provided by the operation executed in step S52 may be combined with each other by an OR logic operation. The result of this combination may be assigned to the Boolean variable CP4. In this manner, if the data items D1 and D2 are identical, the result XS4 may be equal to 0, and therefore the variable CP4 may be equal to 0 (or False). On the other hand, if the data items D1 and D2 differ from each other by at least one bit, the result XS4 may not be necessarily different from 0, and therefore the variable CP4 can be equal to 0 or 1.

A combination of the variables CP3 and CP4, for example, CP3 AND (~CP4), makes it possible to determine whether the data items D1 and D2 are identical or not, (~CP4) representing the one's complement of the variable CP4. Thus, the combination CP3 AND (~CP4) may be equivalent to the variable CP1 or CP2. Other comparison variables may be calculated, for example by reversing the roles of the data items D1 and D2 in the comparison sequences SCP3 and SCP4.

In some implementations, several of the comparison sequences SCP1-SCP4 may be executed following a call to the SCP function. In other implementations, all the comparison sequences may be executed to produce the comparison variables CP1-CP4.

In some implementations, the computed values of the comparison variables CP1-CP4 may be stored separately when the function SCP is executed and can be combined by logical operations only when they are checked by the verification functions called in steps S3 and S5.

It should be noted that each data item D1 and D2 originating from a data memory may be read in memory each time a comparison variable CP1-CP4 is computed, in order to obtain greater security, based on the knowledge that an attack may disturb one of the readings of the data items to be compared D1, D2, carried out in any of steps S20, S21, S30, S31, S40, S41 and S50, S51, but it is unlikely that it will disturb all the readings of the data items. Of course, if less security is satisfactory, or if it is desired to reduce memory accesses or reduce penalty on the execution times, a single reading in memory MEM of each data item to be compared D1, D2 may be performed for computing all the comparison variables CP1-CP4. Of course, if one of the data items to be compared is an immediate value, it does not originate from a data memory and therefore cannot be read in such a memory at each computation of a comparison variable.

Figure 6A:
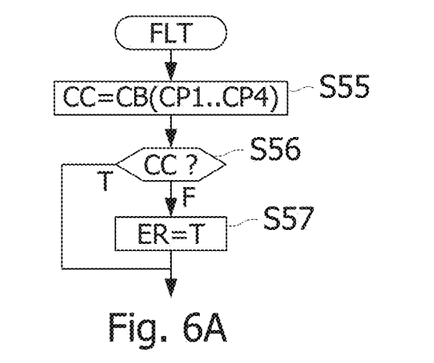
FIGS. 6A and 6B are flowcharts of decision-making supervision sequences following a comparison, according to example embodiments.
Figure 6B:
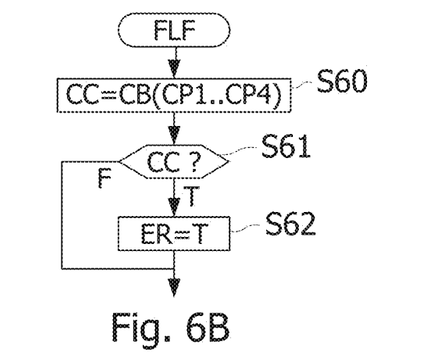

FIGS. 6A and 6B represent steps of coherence checking functions, which are executed following the activation of the flag FLT (step S3) or FLF (step S5), according to example embodiments. The steps of FIG. 6A may be executed when the flag FLT is enabled in step S3, e.g., say when the data items D1 and D2 are considered equal at step S1. The steps of FIG. 6A may include a step S55 of logic combination CB of at least some of the comparison variables CP1-CP4 determined by the comparison sequences SCP1-SCP4, and then a step S56 for testing the result CC of this combination. If the result CC of this combination is not consistent with the fact that the flag FLT has been raised, the error signal ER may be enabled in step S57.

The checking sequence of FIG. 6B may be executed when the flag FLF is enabled in step S5, e.g., when the data items D1 and D2 are considered different in step S1. The checking sequence may include a step S60 of logical combination CB of at least some of the comparison variables CP1-CP4 determined by the comparison sequences SCP1-SCP4, and then a step S61 for testing the result CC of this combination. If the result CC of this combination is inconsistent with the fact that the flag FLF has been raised, the error signal ER may be enabled in step S62. In some implementations, the comparison variables CP1-CP4 can be tested separately in steps S56 and S61 instead of being combined beforehand by logical operations.

The logic combination of the comparison variables CP1-CP4 performed in steps S55 and S60 may include a step for checking the consistency between these variables, for example, by checking that the combination CP3 AND (~CP4) is equal to the variable CP1 and/or CP2.

By virtue of these arrangements, if an attacker disrupts the execution of the step S1 in order to force the execution of a test branch carried out in this step, this attack will be detected in the step S56 or S60, which is executed when the flag FLT or FLF is enabled. Thus, for an attack to remain undetected, it is necessary not only to disrupt the execution of the step S1, but also to disrupt the calculations of the comparison variables CP1-CP4 in order to obtain coherent values of these variables with the disrupted execution of step S1, or else disrupt the verification test carried out in the steps S56 or S61. However, attacks such as those carried out with a laser beam are affected with insufficient precision for systematically achieving a particular objective. It therefore appears very difficult to disrupt the execution of the step S1 and the computations of the comparison variables CP1-CP4 in a coherent manner.

Figure 7:
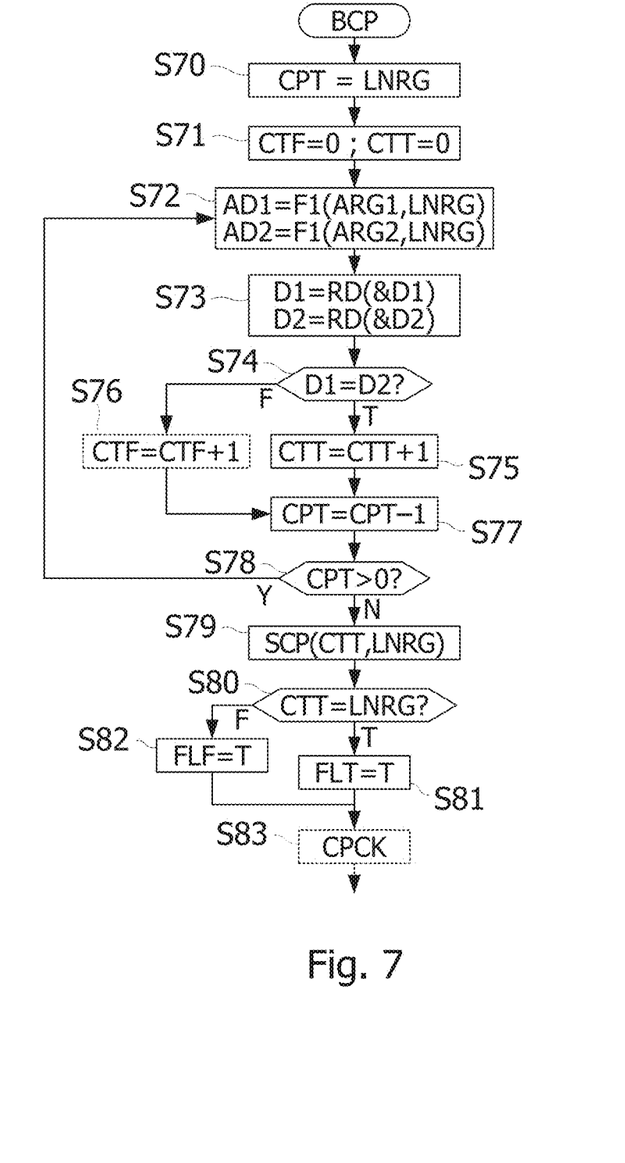
FIGS. 7 and 8 are flowcharts of sequences for comparing two data blocks, according to example embodiments, and FIG. 9 schematically represents a microcircuit or a coprocessor configured to secure a comparison and decision-making operation, according to an example embodiment.

In some implementations, the data items D1 and D2 to be compared are blocks of several words, which are compared word by word. FIG. 7 represents steps S70 to S83 of a procedure BCP for comparing two blocks of several words. Steps S70 to S74 may be executed successively. In step S70, a counter CPT may receive a block size value in number of words for the two blocks to be compared. The value loaded in the counter CPT may be read, for example, from a register LNRG. In step S71, counters CTF, CTT may be initialized to 0. Step S72 includes assigning variables AD1, AD2 with addresses of words to be read in the two blocks to be compared. The values loaded in the variables AD1 and AD2 can be determined using a function F1 applied to the start addresses of the blocks and the size of the blocks to be compared. The start addresses of the two blocks to be compared can be read in registers ARG1, ARG2. The function F1 can be a simple incrementing function from the addresses previously supplied by the function F1 starting with the starting addresses of the blocks to be compared. The function F1 can combine a random or pseudo-random selection function of the rank of a word in each block, based on the size of the blocks and the previously selected ranks, and a function for determining the address of the word to read and compare according to the selected rank and the start address of the block.

In step S73, words D1, D2 fetched at the addresses AD1, AD2 determined in step S72 are read from the memory MEM. In step S74, the words D1 and D2 read in step S73 may be compared. Step S75 or S76 may be executed depending on whether the words D1 and D2 are equal or not. In step S75, the counter CTT, counting the number of equal words in the compared blocks, may be incremented. In step S76, the counter CTF, counting the number of different words in the compared blocks, may be incremented. In some implementations, step S76 may be optional. In step S77 following steps S75 and S76, the counter CPT may be decremented. In step S78, the counter CPT may be compared with 0 and, if it is greater than 0, the execution of the procedure BCP is continued in step S72. Steps S79 and S80 may be executed after step S78, when the counter CPT has reached the value 0. All the words of the two blocks may then be supposedly compared. In step S79, the function SCP may be called to compare the counter CTT to the number of words LNRG of the blocks to be compared. In step S80, the counter CTT may be compared directly with the number of words LNRG of each of the blocks to be compared. Step S81 or S82 may be performed depending on whether the two numbers CTT and LNRG are identical or different. CTT and LNRG being identical mean that the two blocks to be compared are identical. Step S81 therefore may include activating the flag FLT and executing the function for checking consistency between the comparison variables computed in step S79 and the value of the flag FLT. Step S82 may include enabling the flag FLF and executing the function for checking consistency between the comparison variables computed in step S79 and the value of the flag FLT.

Steps S81 and S82 may be followed by step S83. The function CPCK called in step S83 can in particular check that the sum of the counters CTT and CTF is equal to the size of the blocks to be compared LNRG. The counter CTF can also be checked in the same way as in steps S79 to S82, knowing that it should be zero if the counter CTT is equal to the size of the data blocks to be compared. Moreover, only the counter CTF can be calculated and checked if the two blocks to be compared are supposed always different.

The comparison test of each word of the two blocks to be compared carried out in step S74 can also be checked, as before, by calling the function SCP before the comparison test and the functions for enabling the flags FLT and FLF according to the result of the comparison.

Figure 8:
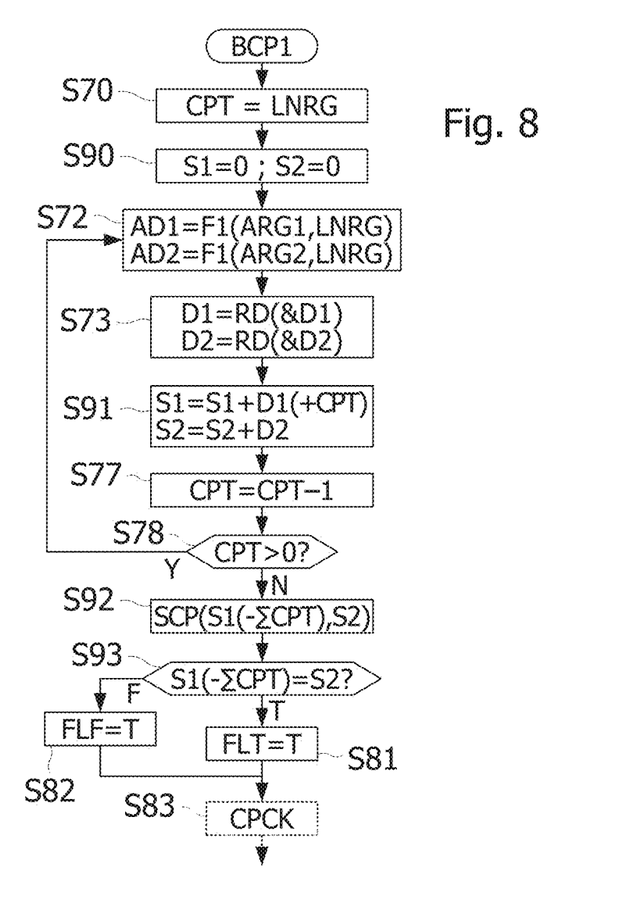

FIG. 8 illustrates an alternative BCP1 to the procedure BCP of FIG. 7. The procedure BCP1 may include the steps S70, S72, S73, S77, S78 and S81 through S83, as well as steps S90 through S93. Step S90 may be executed at the beginning of the procedure BCP1 to initialize sums S1, S2 to 0, for example, between steps S70 and S72. Step S91 may be executed between steps S73 and S77. In step S91, the data read in step S73 may be added respectively to sums S1, S2. The value of the counter CPT can also be added to one of the two sums S1, S2 (to S1 in the example in FIG. 8). Steps S92, S93 may be executed after step S78. In step S92, the function SCP is called to compare the two sums S1, S2. The sums S1, S2 may be identical if the blocks to be compared are identical. On the other hand, the sums S1, S2 may be identical even if the blocks to be compared are different. Consequently, the equality of the sums S1, S2 may not be a sufficient criterion for determining whether the blocks to be compared are identical. In step S93, the sums S1, S2 may be compared directly. Step S81 or S82 may be executed depending on whether the two sums S1, S2 are identical or different. Steps S81 and S82 may be followed by step S83.

In some implementations, the value of the counter CPT may be also added at each iteration to one of the two sums S1, S2 (to S1 in the example of FIG. 8), in step S91. The sum of the successive values of the counter CPT may be thus subtracted from the corresponding sum (S1) before the execution of the steps S92 and S93, bearing in mind that the sum of the successive values of the counter CPT is equal to LNRG×(LNRG+1)/2. Thus, if one of the comparison iterations has not been executed or has been executed twice, the value thus subtracted from the sum S1 does not correspond to the values of the counter CPT that have been added to this sum, and the blocks will be considered different. In this way, it is possible to check that all the words of the blocks have been compared if the sums S1, S2 are identical.

The procedure BCP or BCP1 can be fully carried out by the CCP circuit, or only when comparing two data items, as in step S74, S80 or S93.

In some implementations, the procedures BCP or BCP1 may be executed simultaneously or one after the other. The comparison results provided by these two procedures may then be compared and the error signal ER may be enabled if the comparison results are different.

Figure 9:
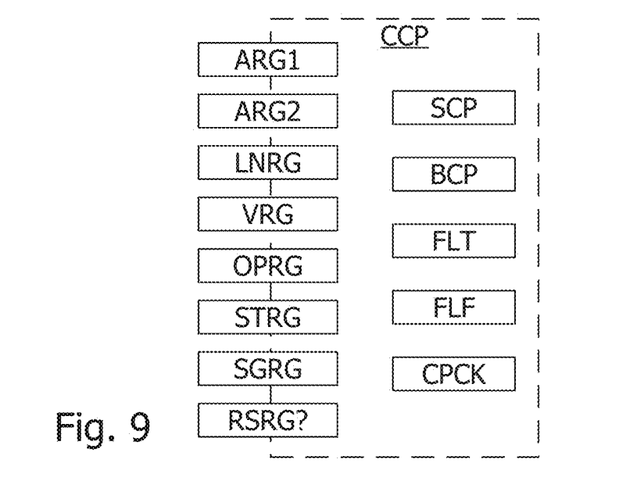

FIG. 9 illustrates the circuit CCP, according to an example embodiment. The circuit CCP may include circuits capable of performing the above-described functions of secure comparison SCP, of raising the flags FLT and FLF with a coherence check, and optionally the block compare function BCP, and the function CPCK for checking the proper execution of a test. The circuit CCP may also include input/output registers such as:
   the address registers ARG1, ARG2 of the data or blocks to be compared,
   the register LNRG for the size of the blocks to be compared, set to 1 if only two words are to be compared (block comprising a single word),
   a register VRG that may receive a value to be compared with data at an address indicated by the register ARG1,
   a control register OPRG, and
   a state register STRG.

The control register OPRG may for example assume the following values:
   01 to enable the block comparison function SCP or BCP applied to two data items or blocks located at the addresses specified in the registers ARG1, ARG2 and whose size is specified in the register LNRG, the function SCP being activated if the value contained in the register LNRG is equal to 1,
   02 to enable the function SCP to compare a data item at the address ARG1 with a value supplied in the register VRG,
   03 to enable the check function CPCK,
   04 to enable the flag FLT and check the consistency of this state with the comparison values calculated by the function SCP or BCP, and
   05 to enable the flag FLF and check the consistency of this state with the comparison values calculated by the function SCP or BCP.

The status register may, for example, provide the values of the comparison variables CP1-CP4.

It will be apparent to those skilled in the art that the present invention is susceptible to various alternatives and applications. In particular, the invention is not necessarily carried out by means of a specialized coprocessor. Indeed, the described functions, fulfilled by the circuit CCP, may be implemented in the form of programmed functions called by the processor PRC. The activation of the signal ER can be carried out, for example, by raising an interruption or an exception of the processor PRC.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a controller, a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional blocks not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, may be embodied in many alternate forms and should not be construed as limited to only the embodiments set forth herein.

Processors suitable for the processing of a computer program include, by way of example, both general and special-purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices; magnetic disks (e.g., internal hard disks or removable disks); magneto-optical disks; and CD-ROM and DVD-ROM disks. The processor and the memory may be supplemented by, or incorporated in special-purpose logic circuitry.

To provide for interaction with a user, implementations may be implemented on a computer having a display device (e.g., a cathode ray tube (CRT), a light-emitting diode (LED), or liquid crystal display (LCD) display device) for displaying information to the user and a keyboard and a pointing device, e.g., a mouse or a trackball, by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation), or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method for securing an execution of a program by a first processing device, the method comprising:

subsequent to an execution of a first instruction of the program by the first processing device and prior to an execution of a data comparison function by the first processing device, receiving, from the first processing device and by a second processing device, an identifier of two data items on which the data comparison function is to be performed by the first processing device;

performing, by the second processing device, a first operation of a plurality of security operations to secure at least the data comparison function of the program, wherein the first operation computes, from the two data items, first comparison results comprising comparison variables representative of comparisons of the two data items;

subsequent to the execution of the data comparison function by the first processing device, receiving, from the first processing device and by the second processing device, an indication that the first processing device has executed a program branch of the program that corresponds to a second comparison result of the data comparison function, wherein the second comparison result identifies the two data items as equal;

responsive to receiving the indication that the first processing device has executed the program branch of the program, performing, by the second processing device, a second operation of the plurality of security operations to update a status indicator to indicate that the second comparison result identifies the two data items as equal;

performing, by the second processing device, a third operation of the plurality of security operations to verify whether the status indicator is consistent with the first comparison results; and responsive to verifying that the status indicator is inconsistent with the first comparison results, performing, by the second processing device, a fourth operation of the plurality of security operations to enable an error signal to secure at least the data comparison function of the program executed by the first processing device, wherein securing the data comparison function secures the execution of the program by the first processing device.

2. The method of claim 1, wherein the comparison variables includes at least two of:

a first binary comparison variable whose value is a function of equivalence of the two data items to be compared, a second binary comparison variable equal to a combination of bits of a first binary word by a logic OR operation, the first binary word resulting from a bit-wise combination of the two data items to be compared by a logical exclusive-OR operation, a third binary comparison variable equal to a combination of bits of a second binary word by a logic AND operation, the second binary word resulting from a bit-wise combination by the logic OR operation of one of the two data items to be compared with a binary one's complement of an other one of the two data items to be compared, or a fourth binary comparison variable equal to a combination of bits of a third binary word by the logic OR operation, the third binary word resulting from a bit-wise combination by the logic AND operation of one of the two data items to be compared with the binary one's complement of the other one of the two data items to be compared.

3. The method of claim 2, wherein at least one of the two data items to be compared is read from a memory at each calculation of one of the comparison variables.

4. The method of claim 1, wherein updating the status indicator to indicate that the second comparison result identifies the two data items as equal comprises activating a flag to indicate that the two data items are equal.

5. The method of claim 1, wherein the two data items to be compared are respectively a first block and a second block, the execution of the data comparison function comprising individually comparing each word of the first block with a corresponding word of the second block, wherein performing the first operation of the plurality of security operations comprises counting a number of equal words between the first and second blocks, wherein the data comparison function compares the number of equal words between the first and second blocks with a number of words in each of the first and second blocks.

6. The method of claim 5, wherein performing the first operation of the plurality of security operations further comprises:

counting a number of different words between the first and second blocks;

counting a number of equal words between the first and second blocks; and determining whether a sum of the number of equal words and the number of different words between the first and second blocks is equal to the number of words in each of the first and second blocks.

7. The method of claim 1, wherein the two data items to be compared are respectively a first block and a second block, wherein performing the first operation of the plurality of security operations, comprises:

calculating a first sum of words of the first block and a second sum of words of the second block.

8. The method of claim 7, wherein calculating the first sum comprises adding successive values of a word counter counting words of the first block, wherein performing the first operation of the plurality of security operations, comprises:

calculating a counter sum of the successive values of the word counter from a number of words in each of the first and second blocks; and modifying the first sum by subtracting the counter sum from the first sum.

9. A circuit for securing an execution of a program by a first processing device, the circuit comprising:

a second processing device configured to:

subsequent to an execution of a first instruction of the program by the first processing device and prior to an execution of a data comparison function by the first processing device, receive, from the first processing device and by the second processing device, an identifier of two data items on which the data comparison function is to be performed by the first processing device;

perform, by the second processing device, a first operation of a plurality of security operations to secure at least the data comparison function of the program, wherein the first operation computes, from the two data items, first comparison results comprising comparison variables representative of comparisons of the two data items;

subsequent to the execution of the data comparison function by the first processing device, receive, from the first processing device and by the second processing device, an indication that the first processing device has executed a program branch of the program that corresponds to a second comparison result of the data comparison function, wherein the second comparison result identifies the two data items as equal;

responsive to receiving the indication that the first processing device has executed the program branch of the program, perform, by the second processing device, a second operation of the plurality of security operations to update a status indicator to indicate that the second comparison result identifies the two data items as equal;

perform, by the second processing device, a third operation of the plurality of security operations to verify whether the status indicator is consistent with the first comparison results; and responsive to verifying that the status indicator is inconsistent with the first comparison results, perform, by the second processing device, a fourth operation of the plurality of security operations to enable an error signal to secure at least the data comparison function of the program executed by the first processing device, wherein securing the data comparison function secures the execution of the program by the first processing device.

10. The circuit of claim 9, wherein the comparison variables includes at least two of:
a first binary comparison variable whose value is a function of equivalence of the two data items to be compared,
a second binary comparison variable equal to a combination of bits of a first binary word by a logic OR operation, the first binary word resulting from a bitwise combination of the two data items to be compared by a logical exclusive-OR operation,
a third binary comparison variable equal to a combination of bits of a second binary word by a logic AND operation, the second binary word resulting from a bit-wise combination by the logic OR operation of one of the two data items to be compared with a binary one's complement of an other one of the two data items to be compared, or
a fourth binary comparison variable equal to a combination of bits of a third binary word by the logic OR operation, the third binary word resulting from a bit-wise combination by the logic AND operation of one of the two data items to be compared with the binary one's complement of the other one of the two data items to be compared.

11. The circuit of claim 10, wherein at least one of the two data items to be compared is read from a memory at each calculation of one of the comparison variables.

12. The circuit of claim 9, wherein to update the status indicator to indicate that the second comparison result identifies the two data items as equal, the second processing device further configured to activate a flag to indicate that the two data items are equal.

13. The circuit of claim 9, wherein the two data items to be compared are respectively a first block and a second block, wherein the execution of the data comparison function individually compares each word of the first block with a corresponding word of the second block, wherein to perform the first operation of the plurality of security operations, the second processing device configured to:

count a number of equal words between the first and second blocks, wherein the data comparison function compares the number of equal words between the first and second blocks with a number of words in each of the first and second blocks.

14. The circuit of claim 13, wherein to perform the first operation of the plurality of security operations, the second processing device configured to:
count a number of different words between the first and second blocks;
count a number of equal words between the first and second blocks; and
determine whether a sum of the number of equal words and the number of different words between the first and second blocks is equal to the number of words in each of the first and second blocks.

15. The circuit of claim 9, wherein the two data items to be compared are respectively a first block and a second block, wherein to perform the first operation of the plurality of security operations, the second processing device configured to: calculate a first sum of words of the first block and a second sum of words of the second block.

16. The circuit of claim 15, wherein the first sum includes successive values of a word counter counting words of the first block, wherein to perform the first operation of the plurality of security operations, the second processing device configured to:
calculate a counter sum of the successive values of the word counter from a number of words in each of the first and second blocks; and
modify the first sum by subtracting the counter sum from the first sum.

17. A non-transitory computer readable medium comprising instructions for securing an execution of a program by a first processing device and that, responsive to execution by a computer, perform operations comprising:
subsequent to an execution of a first instruction of the program by the first processing device and prior to an execution of a data comparison function by the first processing device, receiving, from the first processing device and by a second processing device, an identifier of two data items on which the data comparison function is to be performed by the first processing device;
performing, by the second processing device, a first operation of a plurality of security operations to secure at least the data comparison function of the program, wherein the first operation computes, from the two data items, first comparison results comprising comparison variables representative of comparisons of the two data items;
subsequent to the execution of the data comparison function by the first processing device, receiving, from the first processing device and by the second processing device, an indication that the first processing device has executed a program branch of the program that corresponds to a second comparison result of the data comparison, wherein the second comparison result identifies the two data items as equal;
responsive to receiving the indication that the first processing device has executed the program branch of the program, performing, by the second processing device, a second operation of the plurality of security operations to update a status indicator to indicate that the second comparison result identifies the two data items as equal;
performing, by the second processing device, a third operation of the plurality of security operations to verify whether the status indicator is consistent with the first comparison results; and responsive to verifying that the status indicator is inconsistent with the first comparison results, performing, by the second processing device, a fourth operation of the plurality of security operations to enable an error to secure at least the data comparison function of the program executed by the first processing device, wherein securing the data comparison function secures the execution of the program by the first processing device.

* * * * *